United States Patent
Bancel et al.

(10) Patent No.: US 7,308,635 B2
(45) Date of Patent: Dec. 11, 2007

(54) INTEGRATED CIRCUIT COMPRISING A TEST MODE SECURED BY INITIALIZATION OF THE TEST MODE

(75) Inventors: Frederic Bancel, Lamanon (FR); David Hely, Maseille (FR)

(73) Assignee: STMicroelectronics S.A., Montrouge (FR)

( * ) Notice: Subject to any disclaimer, the term of this patent is extended or adjusted under 35 U.S.C. 154(b) by 310 days.

(21) Appl. No.: 11/046,381

(22) Filed: Jan. 28, 2005

(65) Prior Publication Data

US 2005/0172185 A1 Aug. 4, 2005

(30) Foreign Application Priority Data

Jan. 29, 2004 (FR) ................... 04 00835

(51) Int. Cl.
*G01R 31/28* (2006.01)
*G06F 11/30* (2006.01)

(52) U.S. Cl. ................ 714/734; 713/194
(58) Field of Classification Search ............ None
See application file for complete search history.

(56) References Cited

U.S. PATENT DOCUMENTS

| | | | | |
|---|---|---|---|---|
| 5,293,610 A | * | 3/1994 | Schwarz | 711/164 |
| 5,452,355 A | * | 9/1995 | Coli | 713/194 |
| 6,457,126 B1 | * | 9/2002 | Nakamura et al. | 713/166 |
| 7,076,667 B1 | * | 7/2006 | Gama et al. | 713/193 |
| 2002/0133773 A1 | | 9/2002 | Richter et al. | |
| 2003/0204801 A1 | | 10/2003 | Tkacik et al. | |

FOREIGN PATENT DOCUMENTS

EP 1089083 4/2001

OTHER PUBLICATIONS

Scan Based Side Channel Attack on Dedicated hardware implementations of Data Encryption Standard' by Yang et al. International Test Conference, Proceedings. ITC 2004. Publication Date: Oct. 26-28, 2004 pp. 339-344 ISBN: 0-7803-8580-2 INSPEC Accession No. 8291736.*

(Continued)

*Primary Examiner*—Cynthia Britt
(74) *Attorney, Agent, or Firm*—Lisa K. Jorgenson; Jose Gutman; Fleit Kain Gibbons Gutman Bongini & Bianco P.L.

(57) ABSTRACT

An electronic circuit, having a test mode in application of the "internal scan path" technique, includes a plurality of configurable cells and a control circuit. The electronic circuit is adapted to working in a standard mode of operation or in a test mode during which the control circuit is active and configures the configurable cells either in a functional state or in a chained state. The electronic circuit furthermore includes a validation circuit that performs the following operations successively when it receives an instruction for changing the mode of operation (TEST, FIN) of the electronic circuit: produce initialization signals (INIT1, INIT2, . . . , INITN) to command the initialization of all the configurable cells, and then produce a mode-changing signal (VAL).

12 Claims, 2 Drawing Sheets

OTHER PUBLICATIONS

"Automatic Test Equipment (ATE) on a Network (securing access to equipment and data)" by McCarty, AUTOTESTCON Proceedings, 2000 IEEE Publication Date: 2000 On pp. 490-496 ISBN: 0-7803-5868-6 INSPEC Accession No. 6812928.*

Jaramillo, K., et al., "10 Tips for Successful Scan Design: Part One," EDN Electrical Design News, Cahners Publishing Co., Newton, MA, US, vol. 45, No. 4, Feb. 17, 2000, pp. 67-73, 75, XP000966353, ISSN: 0012-7515.

Search Report for French Patent Application No. 0400835 dated Oct. 4, 2004.

* cited by examiner

INTEGRATED CIRCUIT COMPRISING A TEST MODE SECURED BY INITIALIZATION OF THE TEST MODE

CROSS-REFERENCE TO RELATED APPLICATION

This application is based upon and claims priority from prior French Patent Application No. 04 00835, filed on Jan. 29, 2004, the entire disclosure of which is herein incorporated by reference.

BACKGROUND OF THE INVENTION

1. Field of the Invention

The invention generally relates to synchronous electronic integrated circuits provided with combinatorial logic means, flip-flop circuits, and test means. More specifically, the invention relates to an electronic circuit comprising a plurality of configurable cells and a control circuit, the electronic circuit being adapted to working in a standard mode of operation or in a test mode during which the control circuit is active and configures the configurable cells:

either in a functional state in which the configurable cells are functionally linked to logic cells with which they co-operate to form a logic circuit, or in a chained state in which the configurable cells are functionally connected in a chain to form a shift register.

2. Description of the Related Art

At present, there are well-known ways of testing for the proper working of the functional elements of an integrated circuit. This is done by the imposition and/or determination, at predefined instants, of data values present at certain internal points of this integrated circuit.

Such a technique of testing the internal paths of an integrated circuit (called a "scanpath" or "internal scan method") is described for example by M. Williams and J. Angel, in "Enhancing Testability of LSI Circuits Via Test Points and Additional Logic, IEEE Transactions on Computers, vol. C-22, No. 1; January 1973".

According to this technique, each of the flip-flop circuits of the logic circuit, whose state needs to be known and/or for which it is necessary to impose the content during the standard operation of the integrated circuit, is provided at its input with a multiplexer.

The different flip-flop circuits and the multiplexers that are associated with these flip-flop circuits thus constitute an equivalent number of configurable cells whose access ports are individually controlled by these multiplexers.

The multiplexers of these different configurable cells are collectively controlled by an access controller or TAP (Test Access Port) controller which is inactive or active depending on a chosen mode of operation of the electronic circuit (standard mode of operation or test mode). When the TAP controller is activated by a mode control signal (entailing the passage of the electronic circuit into test mode), it uses this set of configurable cells either as a standard functional circuit, integrated into the logic circuit that it forms with the logic cells, or as a test circuit.

To do this, the TAP controller addresses control signals on various control conductors by which it is connected to the different configurable cells. These control signals are, for example, a chaining control signal or again a data propagation control signal. They modify the paths of the circulation of data items within the integrated circuit and thus enable the capture of these data items by the controller with a view to its analysis.

In the standard mode of operation, the TAP controller is inactive and the multiplexers of the configurable cells are positioned in such a way that the flip-flop circuits of these cells are connected to surrounding logic cells to define one or more functional sub-sets of the integrated circuit.

In the test mode of the electronic circuit, the TAP controller is normally activated by a test execution command received from the exterior, and it can produce a chaining control signal for the series connection of the flip-flop circuits of the configurable cells so as to form a shift register.

This register comprises especially a serial input and a serial output respectively connected to an output and to an input of the TAP controller, as well as a clock input receiving a clock signal to set the pace of the flow of data.

A test of the integrated circuit is performed by activating the TAP controller; the test comprises chiefly the following three steps:

In a first step, the TAP controller configures the cells in test mode and then serially loads data into the flip-flop circuits of the configurable cells through the input of the shift register formed by these cells;

Then, the TAP controller changes the selection switching of the multiplexers to form the functional circuit (standard functioning mode), and orders the execution of one or more clock cycles by this functional circuit. The data items loaded into the flip-flop circuits of the configurable cells are then processed by the functional circuit;

The controller then once again changes the selection switching of the multiplexers to again form the shift register (test mode) and, at the output of the shift register, it serially retrieves the data items stored in the flip-flop circuits of the configurable cells during the last clock cycle.

After the complete downloading of the data, a new test may be executed as the case may be. After all the tests have been performed, the controller produces a signal indicating the end of the test mode (the deactivation by the controller of the test control signal).

Despite the confirmed utility of this testing technique, its practical application may prove to be problematic in certain circumstances, especially in integrated circuits that process secret data.

Indeed, inasmuch as the activation of the test mode may enable a fraudulent individual to read the content of the flip-flop circuits of the configurable cells, this testing technique, in principle, has the drawback of making such circuits highly vulnerable to fraudulent use.

For example, by stopping a process of internal loading of secret data into the integrated circuit at various points in time and by downloading the contents of the shift register, a fraudulent person could obtain information on secret data, and even reconstitute this data.

By activating the test mode, a fraudulent individual could also obtain write access to the flip-flop circuits of the configurable cells to insert fraudulent data, or else place the integrated circuit in an unauthorized configuration. He could thus, for example, access a register controlling a security element such as a sensor in order to deactivate it. He could also insert a piece of erroneous data in order to obtain information on a secret data item.

Accordingly, there exists a need for overcoming the disadvantages of the prior art as discussed above.

SUMMARY OF THE INVENTION

An aim of the invention precisely is to propose an electronic circuit designed to thwart this type of attempt at fraud as discussed above.

To this end, the electronic circuit of the invention, which is also compliant with the generic definition given to it by the above introduction, is essentially characterized by the fact that it furthermore comprises a validation circuit in order to perform the following operations successively when the validation circuit receives an instruction for changing the mode of operation (TEST, FIN (i.e. "end")) of the electronic circuit:

produce initialization signals (INIT1, INIT2, ..., INITN) to command the initialization of all the configurable cells, and then produce a mode-changing signal (VAL).

Thus, with the invention, at each change in mode, the configurable cells are initialized. Interrupting the standard mode of operation of the electronic circuit, passing into test mode and unloading the contents of the flip-flop circuits no longer makes it possible to obtain information on the contents of the configurable cells at the instant of the interruption. Similarly, if data items are introduced into the configurable cells just before the passage from the test mode to the standard mode, these data items are erased by an initialization before the standard mode is activated. It is therefore no longer possible to inject erroneous data.

Preferably, the validation circuit is also laid out in order that, after having produced the initialization signals, it:

verifies that the configurable cells have been correctly initialized, and then produces the mode-changing signal only if the cells have been correctly initialized.

The verification of the state of the cells makes it possible especially to verify that the initialization signals have been properly sent, that there is no break in the conductors on which these signals are travelling, etc.

According to a preferred embodiment, the validation signal has a verification circuit which receives data output signals from the configurable cells and delivers a state signal that selectively adopts a state representing a correct initialization or a state representing an incorrect initialization of the configurable cells, depending on whether or not the output signals correspond to predefined output signals.

BRIEF DESCRIPTION OF THE DRAWINGS

Other features and advantages of the invention shall appear more clearly from the following description of a preferred embodiment. This description is given by way of example and in no way restricts the scope of the invention. It is made with reference to the appended drawings, of which.

DETAILED DESCRIPTION

Figure 1:
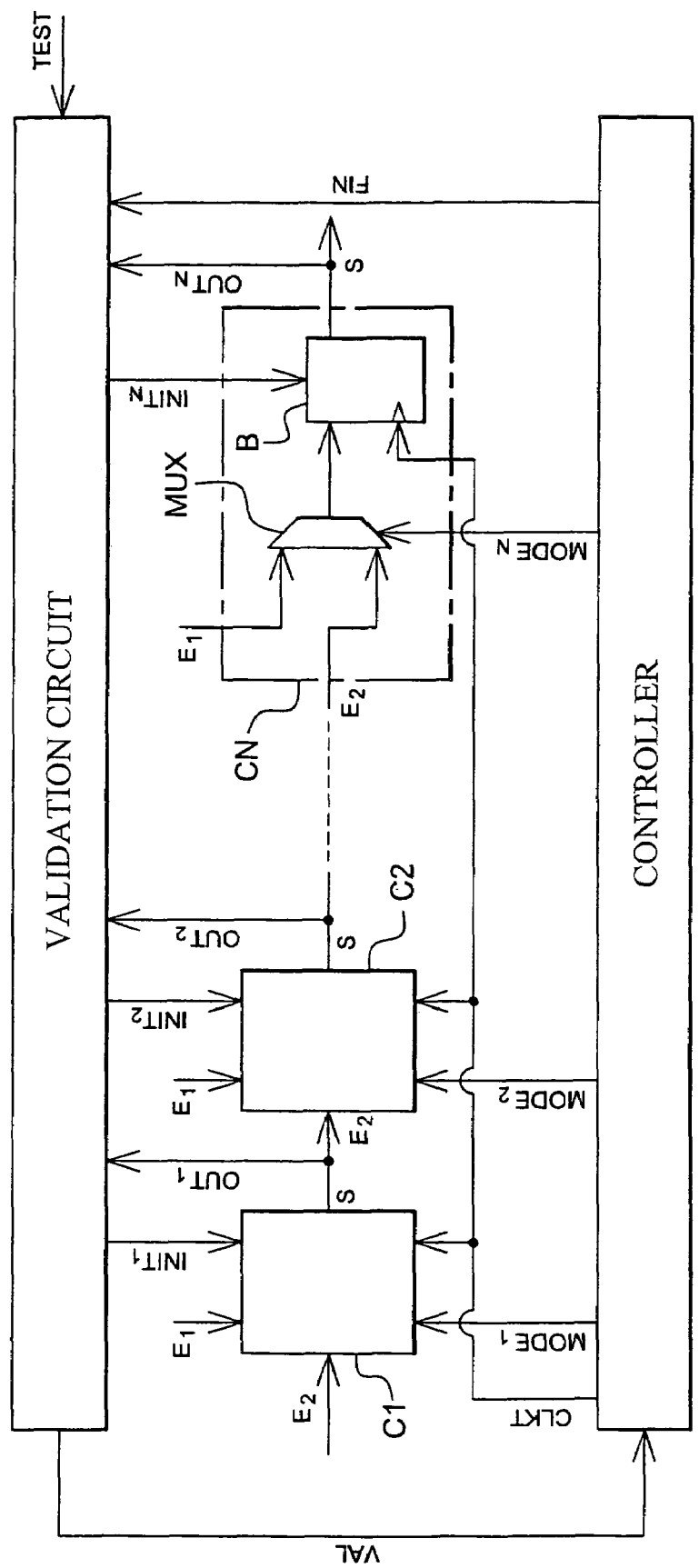
FIG. 1 is an electronic circuit comprising a secured test mode according to the invention.

The circuit of FIG. 1 comprises especially a set of identical configurable cells C1, ..., CN (only the cell CN is described in detail) and a control circuit (or TAP controller), together forming a circuit identical to a prior art electronic circuit as described in the introduction to the description.

Each configurable cell comprises a multiplexer MUX and a flip-flop circuit B, for example of the flip-flop type. The TAP circuit produces the control signals MODE1, MODE2, ..., MODEN (coming from a same source), each signal respectively configuring one cell C1, ..., CN, and more specifically the multiplexer MUX of this cell.

When the signals MODE1, MODE2, ..., MODEN are inactive, in each configurable cell, the multiplexer MUX connects a data input of the flip-flop circuit B to a data input E1 of the cell, the input E1 being functionally linked to one or more logic cells (not shown) with which the flip-flop circuit co-operates to form a logic circuit.

Inversely, when the controller produces the active signals MODE1, MODE2, ... MODEN, in the cell, the multiplexer MUX connects the data input of the flip-flop circuit B to a data input E2 of the cell, the input E2 being functionally connected to a data output S of a preceding cell. The set of the N cells thus forms a shift register. The input E2 of the first cell C1 forms the input of the shift register and the output S of the last cell CN forms the output of the register.

In a prior art circuit, as described here above, the test mode is activated (and consequently the standard operation mode is deactivated) when the controller is activated by a signal from the exterior; and the test mode is deactivated when the controller produces a signal indicating the end of the unloading of data contained in the configurable cells.

Figure 2:
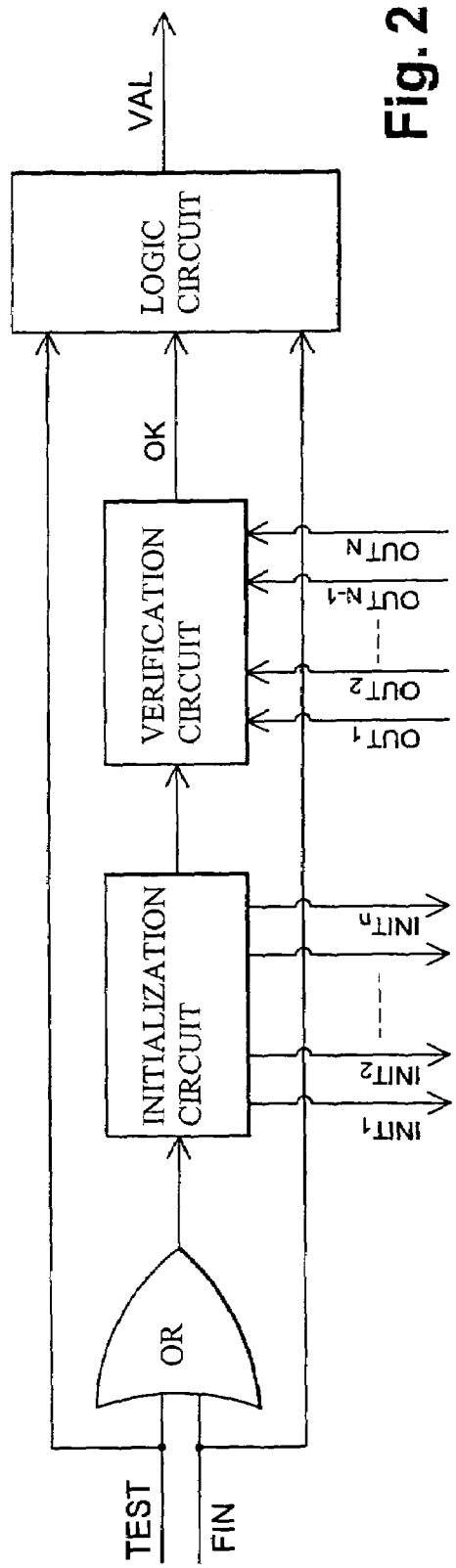
FIG. 2 is an exemplary embodiment of a validation circuit used in the circuit of FIG. 1.

According to the invention, the prior art circuit is complemented by a validation circuit which will manage the start and the end of the test mode. An example of a validation circuit is represented in FIG. 2.

The validation circuit comprises an initialization circuit that produces a set of initialization signals INIT1, ..., INITN, when it receives the following signals represented by the OR logic gate (FIG. 2):

the active external TEST signal signifying that an external user wishes to perform a test, or the signal FIN (i.e. END) sent by the TAP controller signifying that it has terminated the test phase.

Each signal INIT1, ..., INITN respectively initializes a cell C1, ..., CN, and more specifically imposes an initial value on the flip-flop circuit B of this cell.

The validation circuit also comprises a verification circuit that receives a set of output signals OUT1, OUT2, ..., OUTN, respectively corresponding to the output signals of the cells C1, C2, ..., CN. When the verification circuit is activated by the initialization circuit, it verifies that the signals OUT1, ..., OUTN have values corresponding to the expected initial values. The verification circuit is, for example, a combinatorial logic circuit that combines the signals OUT1, ..., OUTN, or only a part of them, and delivers an output signal OK that is active or inactive depending on whether or not the combination of the signals corresponds to an expected value. The signals OUT1, OUT2, OUTN are not necessarily all equal to 1 or to 0, but always have a same value after each initialization so that, at each validly performed initialization, the combination of the signals OUT1, ..., OUTN always has the same expected value.

In the example, the validation circuit finally has a logic circuit that produces the signal VAL from signals OK, TEST, and/or FIN. The signal VAL is:

active if the test signals and OK are active, or inactive if the signals FIN and OK are active.

The electronic circuit according to the invention generally works as follows. It is assumed that, initially, the circuit is in standard operation mode. The controller and the validation circuit are therefore inactive.

1. When the validation circuit receives a test execution command (with the signal TEST active), the initialization circuit:
   produces the active signals INIT1, ..., INITN;
   activates the verification circuit, and then
   the verification circuit receives the signals OUT1, ..., OUTN, verifies them and produces the active signal OK if these signals have an expected predefined value,
   the signal VAL is activated (with the signals TEST and OK being active)
   the controller is activated by the signal VAL (with the passage of the electronic circuit from the functional mode into the test mode) and performs the test by driving the cells alternately in a functional state or in a chained state. The controller then produces the active signal FIN indicating that it has terminated the test.
2. When the validation circuit receives the active signal FIN produced by the controller, the initialization circuit:
   produces the active signals INIT1, ..., INITN;
   activates the verification circuit, and then
   the verification circuit receives the signals OUT1, ..., OUTN, verifies them and produces the active signal OK if these signals have an expected predefined value,
   the controller is deactivated by the inactive signal VAL (with the signals FIN, OK being active): this being the passage of the electronic circuit from the test mode into the functional mode.

While there has been illustrated and described what is presently considered to be embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. An electronic circuit comprising:
   a plurality of configurable cells;
   a control circuit, the electronic circuit being adapted to working in a standard mode of operation or in a test mode during which the control circuit is active and configures the plurality of configurable cells in any one of the following two states:
      a functional state in which all of the plurality of configurable cells are functionally linked to logic cells with which they co-operate to form a logic circuit, and
      a chained state in which all of the plurality of configurable cells are functionally connected in a chain to form a shift register; and
   a validation circuit in order to perform the following operations successively when the validation circuit receives an instruction for changing the mode of operation of the electronic circuit:
      produce initialization signals to command the initialization of the plurality of configurable cells,
      verify, by using data output signals from configurable cells, that all of the plurality of configurable cells have been correctly initialized, and then
      produce the mode-changing signal only if all of the plurality of configurable cells have been correctly initialized.

2. The electronic circuit according to claim 1, wherein the validation circuit comprises a verification circuit which receives data output signals from the plurality of configurable cells and delivers a state signal that selectively adopts a state representing a correct initialization or a state representing an incorrect initialization of the plurality of configurable cells, depending on whether or not the data output signals correspond to predefined output signals.

3. The electronic circuit according to claim 2, wherein the verification circuit comprises a combinatorial logic circuit that carries out a logic combination of all or part of the data output signals and delivers the state signal.

4. The electronic circuit according to claim 1, wherein the initialization signals are applied respectively to an initialization input of the flip-flop circuits of the plurality of configurable cells.

5. An integrated circuit device comprising:
   at least one electronic circuit each electronic circuit thereof including:
   a plurality of configurable cells;
   a control circuit, electrically coupled with the plurality of configurable cells, the electronic circuit being adapted to working in a standard mode of operation or in a test mode during which the control circuit is active and configures the plurality of configurable cells in any one of the following two states:
      a functional state in which all of the plurality of configurable cells are functionally linked to logic cells with which they co-operate to form a logic circuit, and
      a chained state in which all of the plurality of configurable cells are functionally connected in a chain to form a shift register; and
   a validation circuit electrically coupled with the control circuit and with the plurality of configurable cells, in order to perform the following operations successively when the validation circuit receives an instruction for changing the mode of operation of the electronic circuit:
      produce initialization signals that are electrically coupled to each of the plurality of configurable cells, respectively, to command the initialization of the plurality of configurable cells,
      verify, by using data output signals from configurable cells, that all of the plurality of configurable cells have been correctly initialized, and then
      produce the mode-changing signal only if all of the plurality of configurable cells have been correctly initialized.

6. The integrated circuit device of claim 5, wherein the validation circuit comprises a verification circuit which receives data output signals from the plurality of configurable cells and delivers a state signal that selectively adopts a state representing a correct initialization or a state representing an incorrect initialization of the plurality of configurable cells, depending on whether or not the data output signals correspond to predefined output signals.

7. The integrated circuit device of claim 6, wherein the verification circuit comprises a combinatorial logic circuit that carries out a logic combination of all or part of the data output signals and delivers the state signal.

8. The integrated circuit device of claim 5, wherein the initialization signals are applied respectively to an initialization input of the flip-flop circuits of the plurality of configurable cells.

9. A method for secured testing of an electronic circuit, the electronic circuit comprising a plurality of configurable cells, the electronic circuit being adapted to working in a standard mode of operation or in a test mode during which the plurality of configurable cells is configured in any one of the following two states: a functional state in which each of the plurality of configurable cells is functionally linked to a logic cell with which they co-operate to form a logic circuit, and a chained state in which all of the plurality of configurable cells are functionality connected in a chain to form a shift register, the method comprising:

performing the following operations successively in response to receiving at least one of a start test signal and an end test signal for changing the mode of operation of the electronic circuit:

provide initialization signals to each of the plurality of configurable cells, respectively, to command the initialization of the plurality of configurable cells, verify, by using data output signals from configurable cells, that all of the plurality of configurable cells have been correctly initialized, and then produce the mode-changing signal only if all of the plurality of configurable cells have been correctly initialized.

10. The method of claim 9, further comprising:

receiving data output signals from the plurality of configurable cells; and delivering a state signal that selectively adopts a state representing a correct initialization or a state representing an incorrect initialization of the plurality of configurable cells, depending on whether or not the data output signals correspond to predefined output signals.

11. The method of claim 10, further comprising:

carrying out a logic combination of all or part of the data output signals.

12. The method of claim 9, wherein the initialization signals are applied respectively to an initialization input of flip-flop circuits of each of the plurality of configurable cells.

* * * * *

UNITED STATES PATENT AND TRADEMARK OFFICE
CERTIFICATE OF CORRECTION

PATENT NO. : 7,308,635 B2
APPLICATION NO. : 11/046381
DATED : December 11, 2007
INVENTOR(S) : Frederic Bancel et al.

It is certified that error appears in the above-identified patent and that said Letters Patent is hereby corrected as shown below:

On title page item (75)
Please make the following change to (75):
From "MASEILLE" (FR) to -- MARSEILLE --

Signed and Sealed this

Sixth Day of May, 2008

JON W. DUDAS
*Director of the United States Patent and Trademark Office*